United States Patent [19]

Brolund et al.

[11] Patent Number: 4,860,428
[45] Date of Patent: * Aug. 29, 1989

[54] LIFTING HAND FOR A PUNCH PRESS TOOL CHANGER

[75] Inventors: Theodore F. Brolund; Joel C. E. Arnesson, both of Rockford, Ill.

[73] Assignee: W. A. Whitney Corp., Rockford, Ill.

[ * ] Notice: The portion of the term of this patent subsequent to Mar. 17, 2004 has been disclaimed.

[21] Appl. No.: 1,917

[22] Filed: Jan. 9, 1987

[51] Int. Cl.⁴ .............................................. B23Q 3/155
[52] U.S. Cl. ...................................... 29/568; 72/446; 83/698
[58] Field of Search ............................ 29/568; 83/698; 294/86.4; 414/751; 72/446

[56] References Cited

U.S. PATENT DOCUMENTS

| | | | |
|---|---|---|---|
| 4,387,502 | 6/1983 | Dom | 29/568 |
| 4,423,546 | 1/1984 | Scott et al. | 29/568 |
| 4,485,549 | 12/1984 | Brolund | 29/568 |
| 4,587,716 | 5/1986 | Bytow | 29/568 |
| 4,649,622 | 3/1987 | Scott | 29/568 |

Primary Examiner—Z. R. Bilinsky
Attorney, Agent, or Firm—Leydig, Voit & Mayer, Ltd.

[57] ABSTRACT

Cartridges each containing a different punch, stripper and die are moved automatically by a robot-like transfer mechanism between a punch press and a tool rack for storing several of the cartridges. The transfer mechanism is characterized by a hook-like hand having laterally spaced and laterally stationary hooks formed with notches which coact with pins on each cartridge to enable the hand to lift and carry the cartridge. Cam plates with cam surfaces are located adjacent the notches and cam against the pins to automatically shift the cartridge to a laterally centered position in the hand when the hand first lifts the cartridge.

6 Claims, 5 Drawing Sheets 4,860,428

LIFTING HAND FOR A PUNCH PRESS TOOL CHANGER

Background of the Invention

This invention relates generally to an automatic tool changer for a machine tool and, more particularly, to programmable apparatus for automatically changing the punch, stripper and die of a punch press.

The tool changing apparatus of the present invention is especially useful in connection with a punch press of the type in which the punch, stripper and die are held removably in a cartridge when the tools are idle. When the tools are to be used, the cartridge is inserted into the press, the tool holding devices of the press are actuated to lock the tools in the press, and then the cartridge is withdrawn to leave the tools in the press. When the tools have completed their work, the cartridge is returned to pick up the tools preparatory to another cartridge with different tools being inserted into the press.

In the machine tool organization of the invention, several cartridges (e.g., eighty cartridges) all with different tools are contained in a tool storage rack having vertically spaced shelves for holding the cartridges. The automatic tool changing apparatus includes a transfer mechanism or so-called "robot" which is shifted to a selected tool cartridge on a storage shelf, lifts the cartridge from the shelf, shifts the cartridge horizontally toward the punch press, inserts the cartridge into the press to deliver the tools to the press and then withdraws from the press while the tools are being used. After the tools have completed their punching operation, the transfer mechanism re-inserts the cartridge into the press to pick up the tools, shifts the cartridge back to the storage rack, lowers the cartridge onto the shelf and releases the cartridge preparatory to shifting to a different position to pick up another cartridge at a different location on the rack.

When a tool changing transfer mechanism is in the form of a true robot, it is a difficult and very time-consuming operation to program or "teach" the robot to shift to all of its various positions and to stop at precisely predetermined locations. Such "teaching" is conventionally accomplished by a person leading the robot step-by-step through its various moves and positions and using a teaching control to establish the program as the robot is placed through its moves. This usually must be done after the machine tool and the tool changer have been installed and, in most cases, the robot of each tool changer of a like group must be separately and individually programmed.

U.S. Pat. No. 4,649,622 discloses an automatic tool changer having a robot-like transfer mechanism which may be programmed in the relatively quick and simple manner of a standard computer-controlled machine tool and which does not require the complex and time-consuming programming necessary for true robots. The transfer mechanism is capable of picking up cartridges from a tool rack even though the cartridges are not precisely located on the rack. As a result, the tool rack need not be of precision construction to accommodate the movements of the transfer mechanism but instead may be fabricated in a relatively easy and inexpensive manner. In addition, the tool cartridge is capable of floating vertically in the transfer mechanism so that neither the cartridge nor the transfer mechanism need be precisely positioned in order for the transfer mechanism to pick up, transfer and place the cartridge.

The transfer mechanism of the aforementioned Scott patent includes a hook-like "hand" which may be opened and closed relative to the cartridge, which normally captivates the cartridge laterally but which allows the cartridge to float vertically when the cartridge is picked up and placed. The hand is formed by a pair of laterally spaced retainers which are opened by a power actuator to enable the retainers to straddle the cartridge and then are closed. If the cartridge is not centered laterally between the retainers as the retainers are closed, one of the retainers engages the cartridge and pushes the cartridge to a laterally centered position.

SUMMARY OF THE INVENTION

The general aim of the present invention is to simplify the hand of a transfer mechanism of the above type by providing a hand which has laterally fixed retainers but which still is capable of locating the cartridge in a laterally centered position in the hand. As a result of the laterally fixed retainers, there is no need of providing and controlling an actuator for opening and closing the retainers.

A more detailed object of the invention is to provide a hand having unique retainers which cam the cartridge to a laterally centered position in the hand automatically as an incident to lifting the cartridge.

The invention also resides in the novel coaction of cams on the retainers with uniquely shaped pins on the cartridge to effect automatic lateral centering of the cartridge.

These and other objects and advantages of the invention will become more apparent from the following detailed description when taken in conjunction with the accompanying drawings.

DETAILED DESCRIPTION OF THE PREFERRED EMBODIMENT

Figure 1:
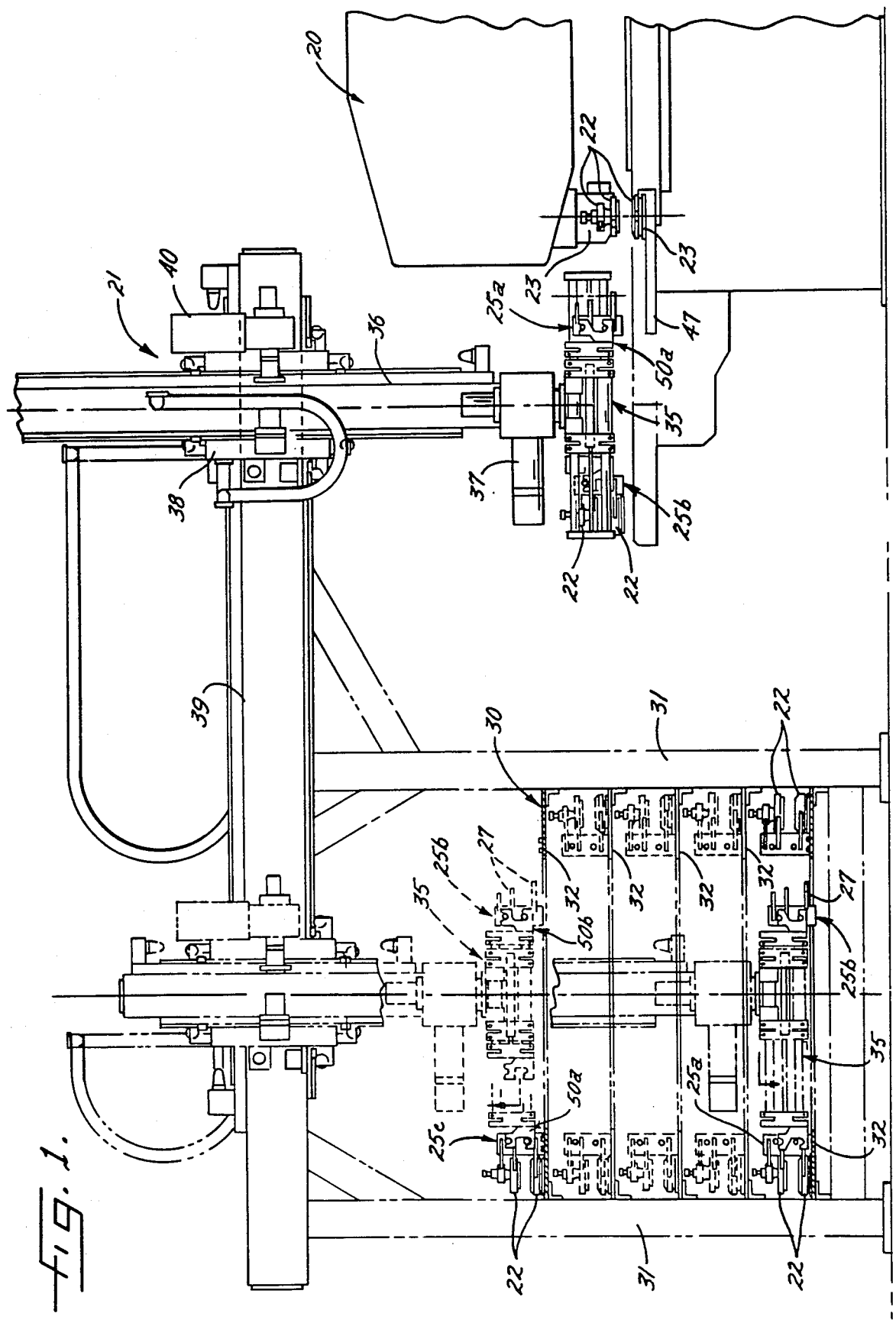
FIG. 1 is a fragmentary side elevational view showing a typical punch press and showing new and improved automatic tool changing apparatus incorporating the unique features of the present invention.

As Shown in the drawings for purposes of illustration, the invention is embodied in a machine tool organization comprising a machine tool in the form of a punch press 20 for forming holes in a work sheet (not shown) and further comprising tool changing apparatus 21 for automatically placing sets of tools 22 in and removing the tools from the punch press. In the present instance, each set of tools 22 comprises an upper punch 22P, an intermediate stripper 22S and a lower die 22D (see FIG. 9).

The punch press 20 itself is of a previously known construction and may be of the same general type as the press disclosed in Brolund U.S. Pat. No. 4,485,549. Briefly, such a press includes holders 23 (FIG. 2) for the tools 22. After the tools have been inserted sidewise into the holders, locking devices (not shown) may be automatically actuated to retain the tools securely in the holders during the punching operation.

Figure 9:
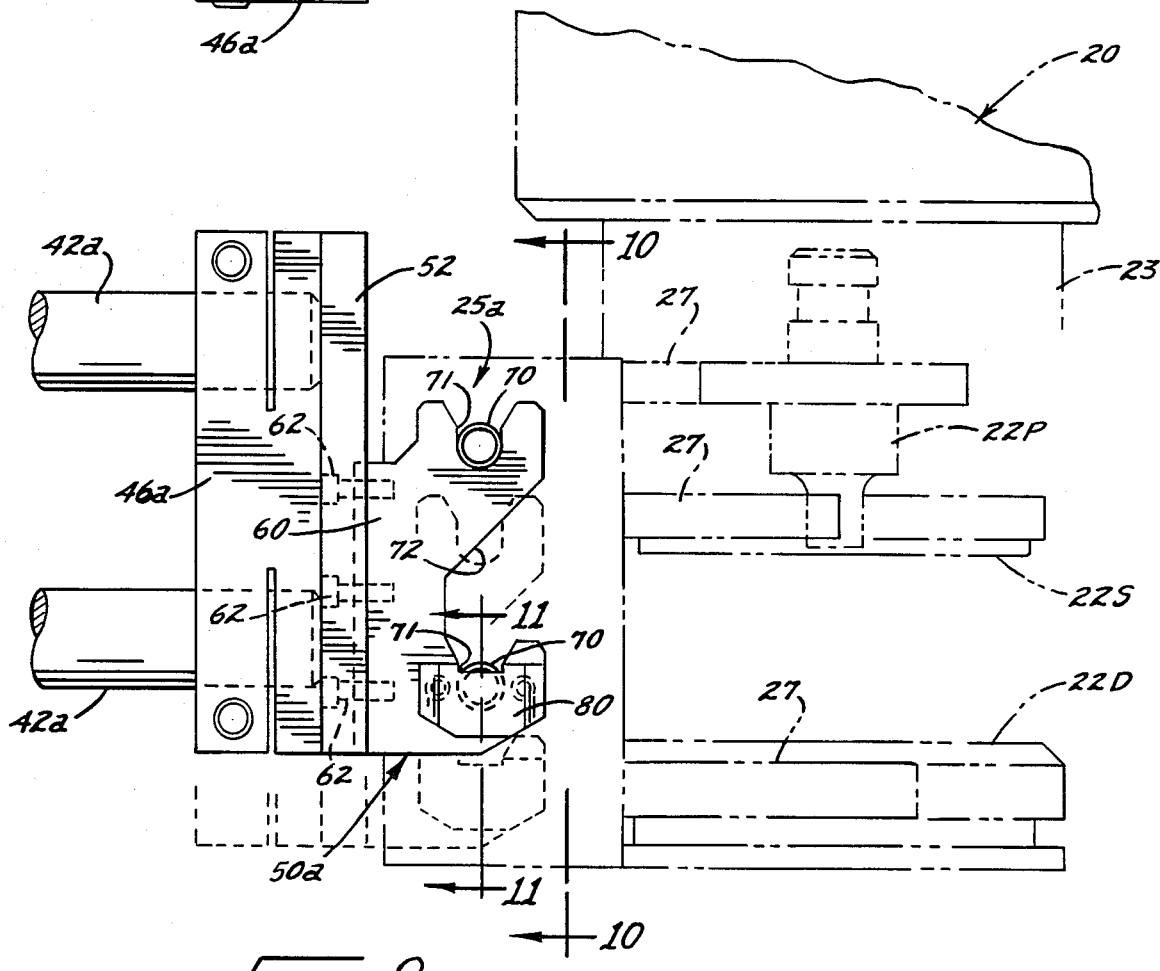
FIG. 9 is a side elevational view of the parts shown in FIG. 8.

As shown most clearly in FIG. 9, the punch 22P, the stripper 22S and the die 22D of each tool set are held by a cartridge 25 when the tool set is not actually working in the press 20. The cartridge comprises an upright, block-like body 26 having three vertically spaced pairs of laterally spaced spring fingers 27 for releasably gripping and holding the three tools 22 of the tool set. By advancing the cartridge forwardly into the press 20, the tools may be inserted sidewise into the holders 23. After the locking devices associated with the holders have been actuated to lock the tools in the holders, the cartridge is retracted rearwardly. As an incident thereto, the spring fingers automatically release the tools to leave the tools in the holders while permitting the cartridge to retract. After the tools have finished their work, the empty cartridge is advanced toward the press to cause the spring fingers to automatically snap over and grip the tools. Once the locking devices of the holders have been released, the cartridge is retracted to pull the tools sidewise out of the holders.

A tool-holding cartridge of the foregoing type is disclosed in Leibinger U.S. Pat. No. 3,678,562. Also, a tool changing operation somewhat similar to the present tool changing operation is explained in detail in Scott et al U.S. Pat. No. 4,423,546.

Several cartridges 25 containing punches 22P, strippers 22S and dies 22D of different sizes and shapes are contained in a tool storage rack 30 (FIG. 1) located in front of the punch press 20. The rack includes a main frame 31 and five vertically spaced and generally C-shaped horizontal shelves 32 attached to the main frame. In the present instance, each shelf supports sixteen cartridges in angularly spaced relation so that a total of eighty different tool sets is stored in the rack. The open throats of the C-shaped shelves face toward the punch press 20.

In general, the tool changing apparatus 21 is adapted to automatically pick up a selected cartridge 25 from its underlying shelf 32, deliver the cartridge to the press 20, advance the cartridge into the press so that the tools 22 may be locked in the holders 23, and then retract the empty cartridge out of the press so that the tools will be free to punch the work sheet. After the punching operation has been completed, the apparatus re-advances the cartridge toward the press to pick up the tools, retracts the tools from the holders 23 and ultimately returns the loaded cartridge to the proper shelf of the tool storage rack 30. Thereafter, the apparatus picks up another cartridge from the rack and delivers that cartridge to the press.

For the foregoing purposes, the tool changing apparatus 21 includes a robot-like transfer mechanism 35 adapted to hold a cartridge 25A at one of its ends and adapted to hold a second cartridge 25B at its other end. The transfer mechanism is mounted for rotation about a vertical axis on the lower end of a vertically extending carriage 36 (FIG. 1) and is adapted to be turned end-for-end by a motor 37. The carriage 36 is mounted to move upwardly and downwardly by a head 38 which, in turn, is mounted on a horizontal gantry 39 to move back and forth between the press 20 and the tool rack 30. Accordingly, the transfer mechanism 35 may be moved horizontally back and forth, may be raised and lowered and may be turned end-for-end about a vertical axis. A motor 40 associated with the carriage 36 effects up and down shifting of the transfer mechanism while an additional motor (not visible) associated with the head 38 effects back and forth movement of the transfer mechanism along the gantry 39. The gantry is supported on and extends cantilever fashion from the frame 31.

In addition to being movable horizontally back and forth with the transfer mechanism 25 between the press 20 and the tool rack 30, each of the cartridges 25A and 25B on the ends of the transfer mechanism may be independently advanced and retracted in a horizontal direction. To this end, the cartridge 25A is adapted to be carried by the ends of a pair of vertically spaced rods 42A (FIGS. 3 and 4) which are quided for back and forth horizontal sliding by a guide head indicated in its entirety by the reference numeral 43 and forming part of the rotatable transfer mechanism 35. The slide rods are located at one side of the guide head and are adapted to be shifted back and forth by a hydraulic cylinder 44A (FIGS. 3 and 7) connected to the guide head and having a reciprocating rod 45A connected to a vertical bar 46A spanning the ends of the slide rods. When the cylinder is actuated, the rod 45A either extends or retracts to advance or retract the slide rods 44A and the cartridge 25A relative to the guide head 43.

Similarly, the cartridge 25B is adapted to be carried by the ends of a second pair of vertically spaced rods 42B (FIGS. 4 and 7) located on the opposite side of the guide head 43 and supported thereon for back and forth horizontal sliding. A second hydraulic cylinder 44B (FIG. 7) is connected to the guide head and includes a reciprocating rod 45B connected to a bar 46B extending vertically between the ends of the slide rods 42B. Actuation of the cylinder 44B results in the rod 45B either extending or retracting to advance or retract the slide rods 42B and the cartridge 25B relative to the guide head 43. Each cartridge 25A and 25B may be advanced and retracted relative to the guide head 43 independently of the other cartridge.

The operation of the tool changing apparatus 21 as described thus far will now be explained. To facilitate the explanation, let it be assumed that the transfer mechanism 35 is located adjacent the front of the press 20 in a standby position as shown in solid lines at the right-hand side of FIG. 1 and as further shown in phantom lines in FIG. 2. Let it further be assumed that the cartridge 25A is empty and that the tools 22 for that cartridge are in working position in the press 20. Finally, assume that the next set of tools to be used by the press is held in the cartridge 25B at the opposite end of the transfer mechanism 35 when the latter is in the aforementioned standby position. When the transfer mechanism is in its standby position, it is slightly elevated so that the bottom of the cartridge 25A is spaced upwardly from a precision manufactured and accurately positioned locating plate 47 attached rigidly to and extending forwardly from the press.

Figure 2:
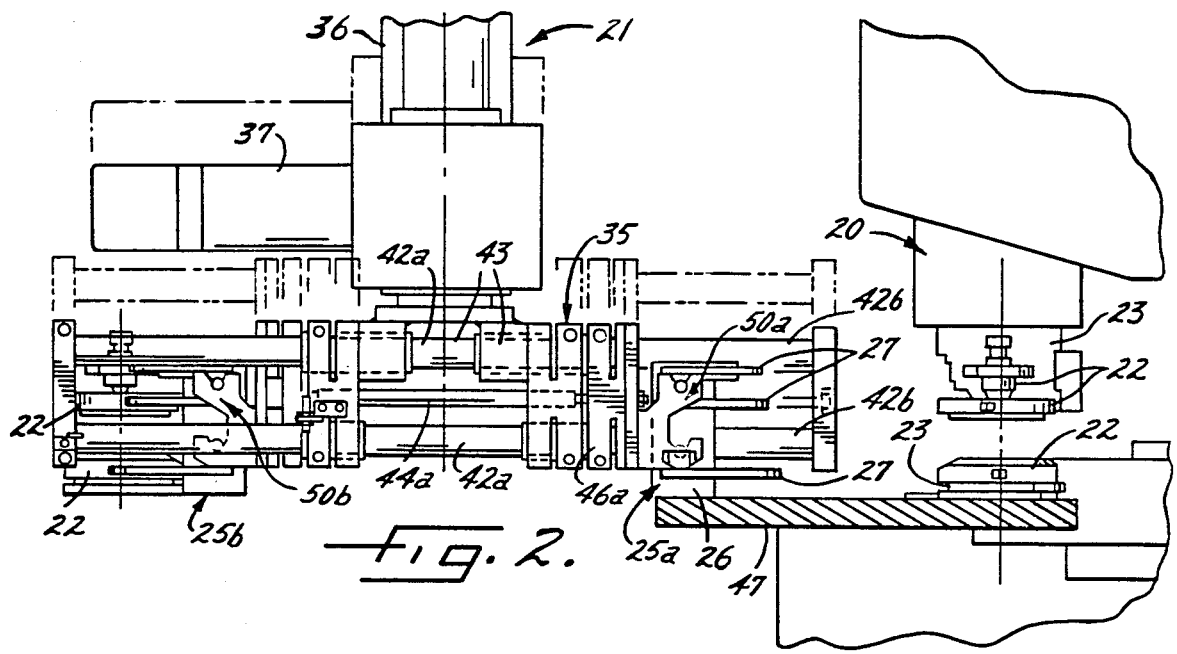
FIG. 2 is a fragmentary side elevation on an enlarged scale of certain parts illustrated in FIG. 1 and particularly shows the robot-like transfer mechanism.

Upon completion of the working cycle of the tools 22 for the cartridge 25A, the entire transfer mechanism 35 is lowered by the motor 40 until the bottom of the cartridge 25A rests on the plate 47 as shown in solid lines in FIG. 2. The plate locates the cartridge precisely at the proper elevation to pick up the tools from the holders 23.

Figure 3:
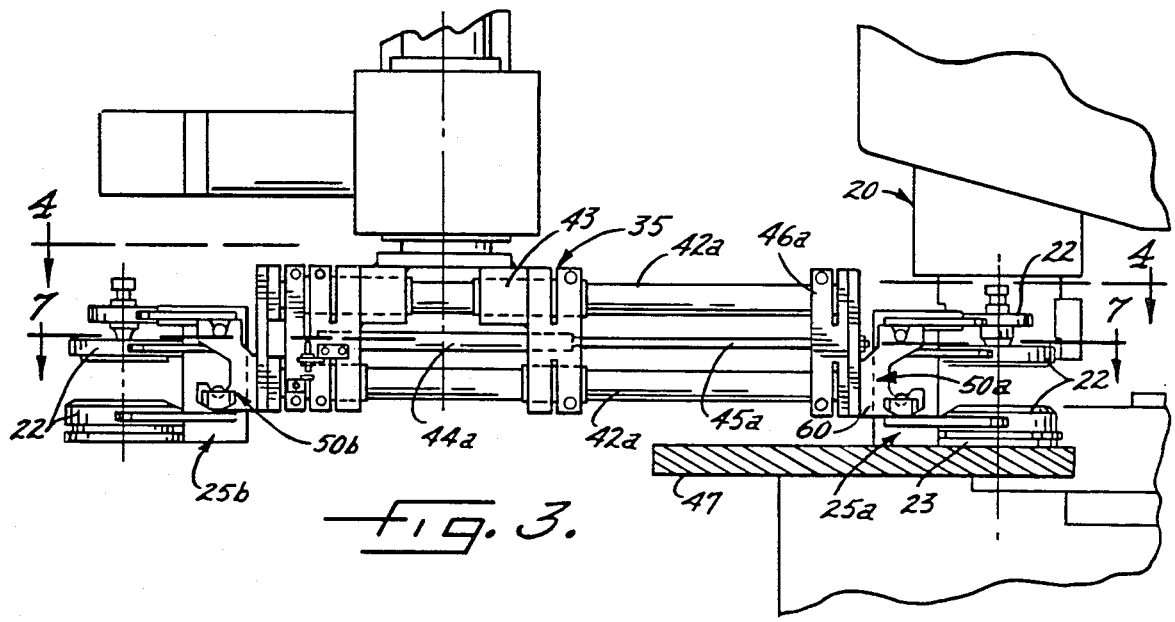
FIG. 3 is a view similar to FIG. 2 but shows the transfer mechanism inserting the tool cartridge into the press.
Figure 4:
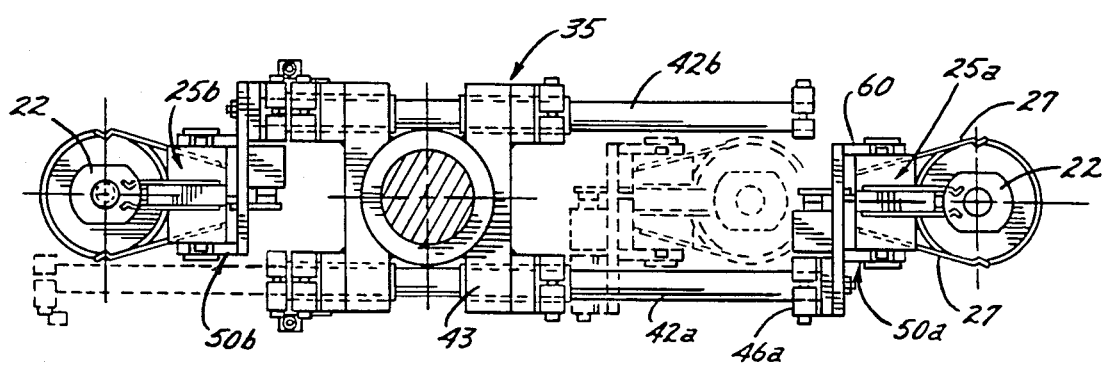
FIG. 4, is a cross-section taken along the line 4—4 of FIG. 3.
Figure 7:
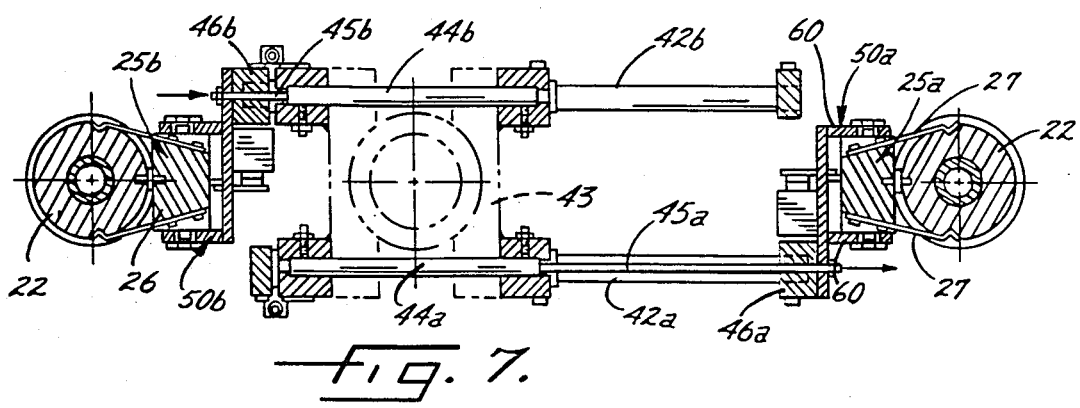
FIG. 7 is a fragmentary cross-section taken substantially along the line 7—7 of FIG. 3.

After the transfer mechanism 35 has been lowered, the cylinder 44A is actuated to advance the cartridge 25A toward the holders 23 as shown in FIGS. 3, 4 and 7. During such advance, the spring fingers 27 of the cartridge snap over and grip the tools 22 in the holders. Thereafter, the locking devices associated with the holders are released to enable the cartridge to remove the tools from the holders.

The cylinder 44A then is actuated to retract the cartridge 25A back to the position shown in FIG. 2 and to take the tools 22 out of the holders 23. The entire transfer mechanism 35 then is raised by the motor 40 and is returned upwardly to the position shown at the right of FIG. 1 in order to lift the cartridge 25A off of the plate 47.

Figure 5:
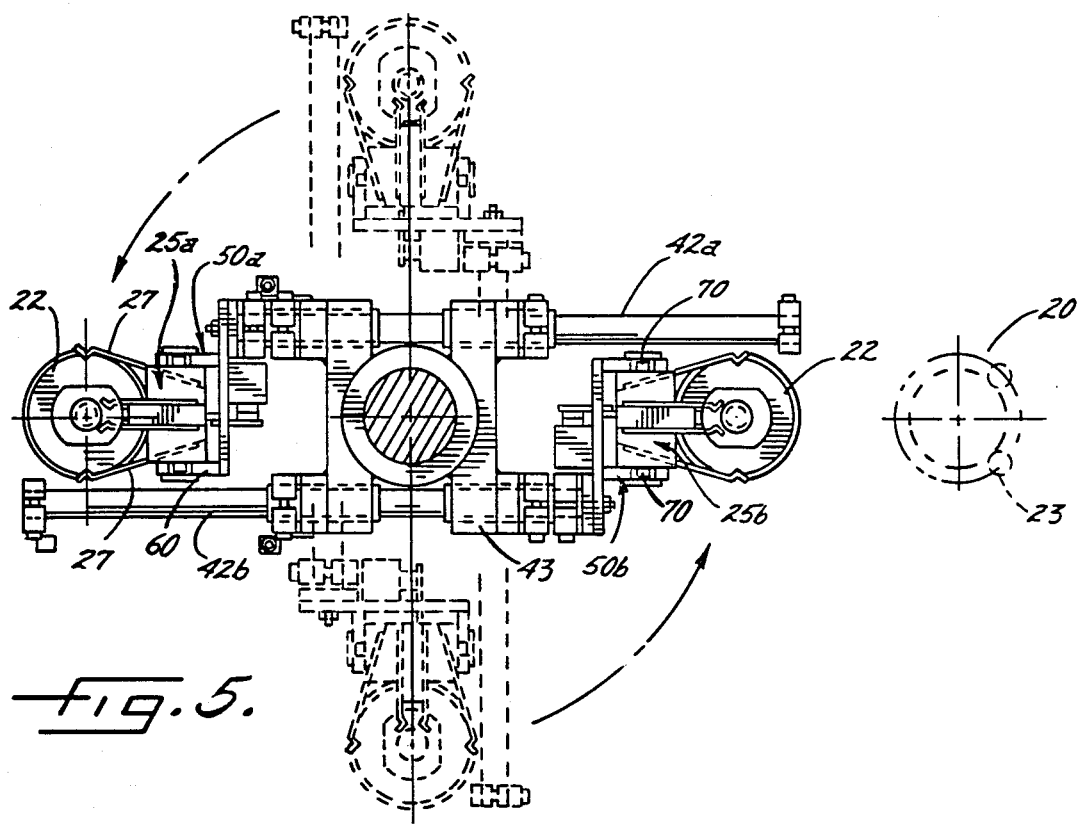
FIGS. 5 and 6 are views similar to FIG. 4 but show the transfer mechanism in successively moved positions.
Figure 6:
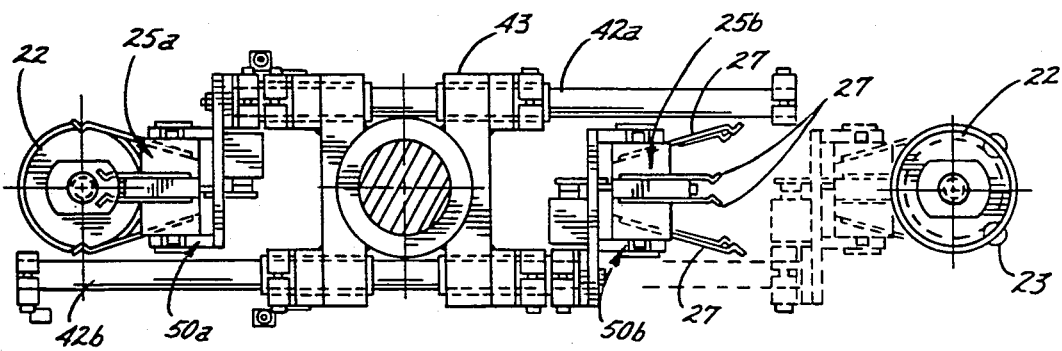

After the transfer mechanism 35 has been raised, it is rotated through 180 degrees by the motor 37 to bring the cartridge 25B to a position adjacent the front of the press 20 as shown in FIG. 5. The transfer mechanism then is lowered to place the cartridge 25B on the locating plate 47 and to position the cartridge at the proper elevation to place its tools 22 in the holders 23. Next, the cylinder 44B is actuated to advance the cartridge toward the press 20 and to place the new tools in the holders as shown in phantom lines in FIG. 6. Following actuation of the locking devices of the holders, the cylinder 44B is actuated to retract the cartridge 25B to the position shown in solid lines in FIG. 6 and thereafter the transfer mechanism 35 is raised by the motor 40 to lift the cartridge 25B off of the plate 47 to the standby position. The cartridge 25B, of course, is empty since its tools are left in the holders to perform a punching cycle.

During the punching cycle, the entire transfer mechanism is shifted horizontally from the press 20 to the storage rack 30 by running the head 38 along the gantry 39 from the position shown in solid lines in FIG. 1 to the position shown in phantom lines. The transfer mechanism 35 moves through the open throats of the C-shaped shelves 32 of the rack 32 and stops moving horizontally when it reaches the vertical centerline of the rack. The transfer mechanism then is shifted vertically to bring the cartridge 25A into proximity with the particular shelf from which the cartridge was previously removed. If necessary, and as usually will be the case, the transfer mechanism also is simultaneously turned angularly to aline the cartridge with its proper angular space on the shelf. In the solid line illustration at the lower left portion of FIG. 1, the transfer mechanism has been shown as having been lowered to a position adjacent the lowermost shelf 32. For simplicity, however, no turning of the transfer mechanism has been shown to have occurred since the particular cartridge 25A which has been illustrated occupies a shelf space directly in line with the back and forth horizontal path of the transfer mechanism.

When the transfer mechanism 35 first stops in the position shown in solid lines at the lower left-hand portion of FIG. 1, the cartridge 25A is in a retracted position and is located with its bottom spaced a short distance above the upper side of the lower shelf 32. With the cartridge 25A in this position, the cylinder 44A is actuated to advance the cartridge to a position overlying the shelf. The transfer mechanism then is shifted downwardly to lower the cartridge onto the shelf, after which the transfer mechanism is uncoupled from the cartridge in a manner to be explained subsequently. After such uncoupling, the cylinder 44A is actuated to retract the slide rods 42A of the transfer mechanism.

The transfer mechanism then is positioned to pick up another cartridge (e.g., a cartridge indicated as 25C in FIG. 1) with different tools 22 from the storage rack 30. In FIG. 1, the cartridge 25C has been shown as being positioned on the top shelf 32 and, for simplicity, has been shown as being directly in line with the recently returned cartridge 25A. Thus, the transfer mechanism 35 is raised to a position in proximity with the cartridge 25C (see the phantom line illustration at the left of FIG. 1) but is not turned as otherwise would occur if the cartridge 25C were spaced angularly from the cartridge 25A.

With the transfer mechanism 35 at the proper elevation relative to the cartridge 25C, the cylinder 44A is actuated to cause the slide rods 42A to advance toward that cartridge. Thereafter, the transfer mechanism is coupled with the cartridge 25C in a manner to be explained subsequently and is shifted upwardly to lift the cartridge from the top shelf. The cylinder 44A then is actuated to retract the cartridge 25C, after which the head 38 is shifted along the gantry 39 to move the transfer mechanism 35 from the storage rack 30 to the press 20. After being positioned in front of the press, the transfer mechanism is lowered to the standby position to complete one cycle of the tool changing operation.

As is apparent from the foregoing, the transfer mechanism 35 moves through a large number of different positions during a tool changing cycle and, in the present instance, handles different cartridges located at eighty different positions on the rack 30. Movement of the transfer mechanism is controlled automatically by a computerized numerical control. If movement of the transfer mechanism was programmed in the manner of a true robot, it would be necessary for a person to "walk" the transfer mechanism through all of its various moves and positions and to use a teaching control to establish the program point-to-point in space. This is a time-consuming operation which usually must be performed at the actual installation site and which usually must be performed individually for each separate installation.

To avoid the need for the foregoing, the transfer mechanism 35 is equipped with "hands" 50A and 50B which are adapted to couple up with the cartridges 25 and which enable movement of the transfer mechanism 35 to be programmed in the relatively simple manner conventionally used in standard machine tool programming. When each hand is coupled with a cartridge, it restricts lateral movement of the cartridge relative to the transfer mechanism but allows the cartridge to float vertically. As a result of such floating, the hand may reliably pick up and deposit cartridges even though the cartridges are located only in approximate vertical positions on the shelves 32 and even though the transfer mechanism is programmed in the general manner of a machine tool and not in the "taught" point-to-point manner of most true robots.

The hand 50A on one end of the transfer mechanism 35 is virtually identical to the hand 50B on the other end of the transfer mechanism and thus only the construction and operation of the hand 50A will be described in detail. In FIGS. 8 to 12 where the hand 50A is illustrated in detail, the hand is shown turned to the same general orientation which it assumes when it is positioned adjacent the punch press 20 to pick up and deposit cartridges 25.

Figure 8:
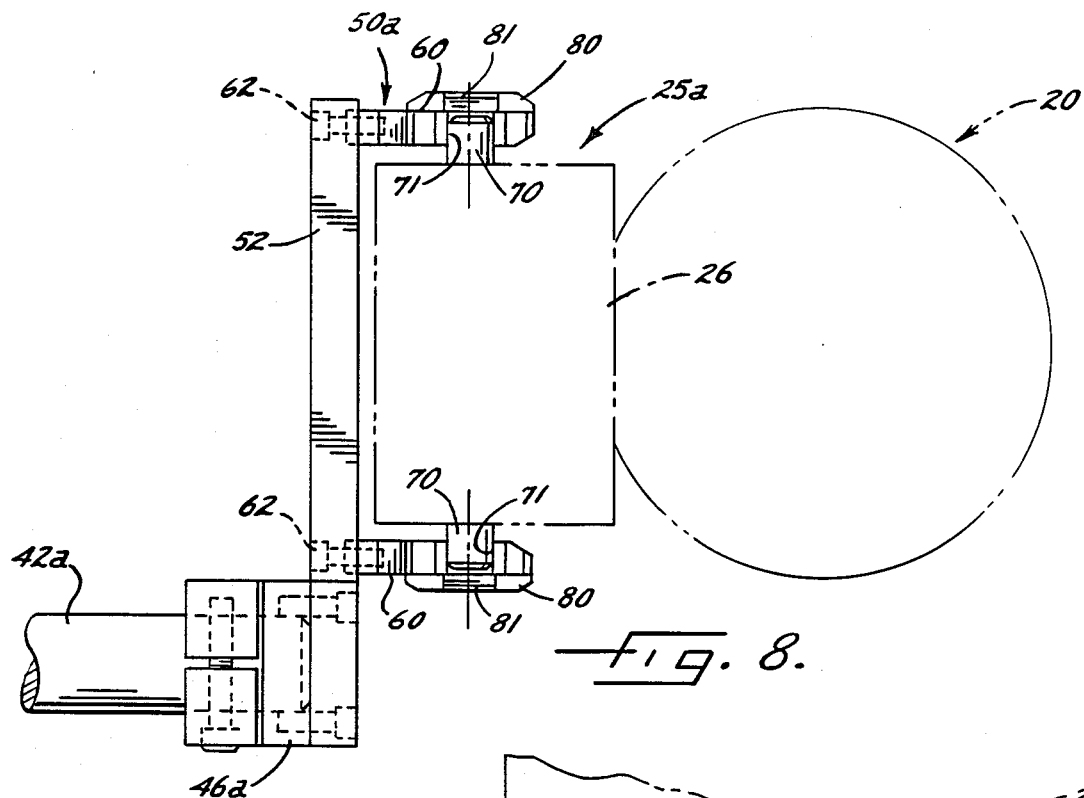
FIG. 8 is an enlarged top plan view of the right-hand portion of the transfer mechanism shown in FIGS. 4 and 7.

Specifically, the hand 50A includes a mounting bracket 52 (FIGS. 8 and 9) which is attached to the bar 46A at the ends of the slide rods 42A, the bracket extending laterally inwardly from the slide rods as shown in FIG. 8. The hand 50A also includes a pair of laterally spaced retainers or "hooks" 60 adapted to straddle or embrace the cartridge 25A and captivate the cartridge against lateral movement when the cartridge is being carried by the hand 50A. Herein, each retainer or hook 60 is an upright substantially platelike member which is attached to the mounting bracket 52 by screws 62 (FIGS. 8 and 9).

Each retaining element or hook 60 includes means adapted to coact with lifting elements 70 on the cartridge 25A to enable the hooks to lift and carry the cartridge while still enabling the cartridge to float vertically relative to the hooks. Herein, the lifting elements 70 comprise horizontal pins (FIGS. 8, 9 and 11) attached rigidly to and projecting laterally from opposite sides of the body 26 of the cartridge, there being two vertically spaced pins at each side of the cartridge. The means which coact with the pins to lift the cartridge comprise upwardly opening notches 71 formed in the hooks 60, each hook having upper and lower vertically spaced notches for receiving the upper and lower pins.

As shown most clearly in FIG. 9, the upper notch 71 of each hook 60 opens upwardly out of the upper end of the hook and includes an upwardly flaring upper portion and a vertical-sided lower portion. The upper portion of the notch defines a throat having a width significantly greater than the diameter of the pin 70 so as to enable the pin to easily enter the notch even when the pin is offset from the vertical centerline of the notch. The width of the vertical-sided lower portion of the notch, however, closely approximates the diameter of the pin so as to captivate the pin against any substantial fore-and aft movement when the pin is fully seated in the notch.

The lower notch 71 of each hook 60 includes an upwardly flared upper portion and a vertical-sided lower portion identical to the upper notch. The upper end portion of the lower notch, however, opens into a large slot 72 (FIG. 9) formed through the hook 60 and opening out of the outboard edge of the hook. The slot 72 permits the lower pin 70 to enter and leave the lower notch 71 when the hook is moved toward and away from the cartridge 25A.

Figure 10:
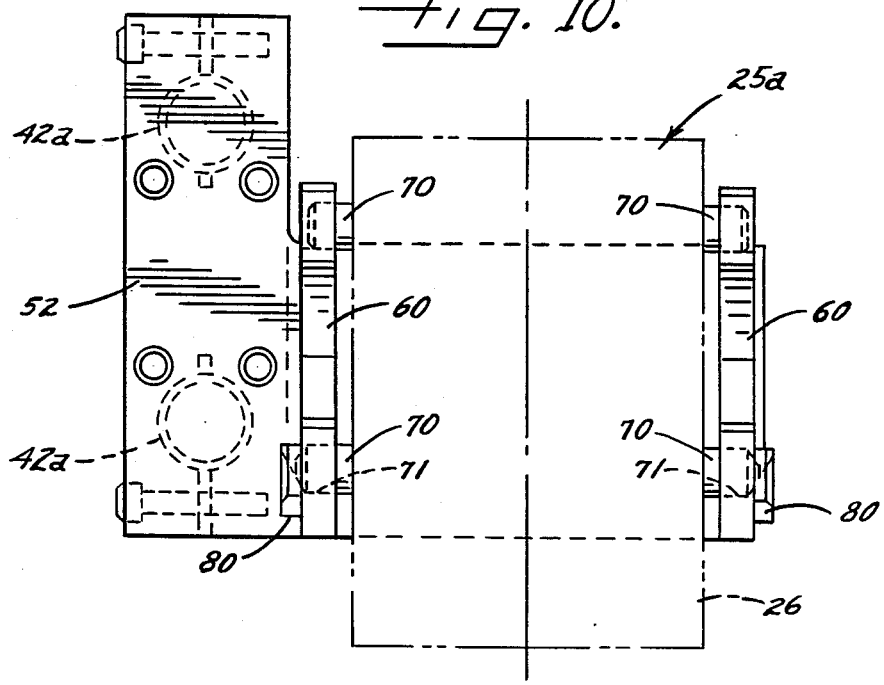
FIG. 10 is a view taken substantially along the line 10—10 of FIG. 9.

The operation of the hand 50A as described thus far now will be explained. When the transfer mechanism 35 is in its standby position shown at the right side of FIG. 1, the cartridge 25A is held in the hand 50 by virtue of the four lifting pins 70 on the cartridge being disposed in and bottomed out against the four notches 71 of the hooks 60. At this time, the hooks straddle the laterally facing sides of the body 26 of the cartridge as shown in FIGS. 8 and 10 to restrict the cartridge against any significant lateral shifting. There is, however, substantial lateral clearance (e.g., a clearance of about $\frac{1}{4}''$ between each hook and the adjacent side of the cartridge and thus the hooks do not contact or grip the sides of the cartridge. Accordingly, the cartridge remains free to float vertically between the hooks as permitted by the pins 70 and the notches 71.

As the first step in a cycle, the transfer mechanism 35 is shifted downwardly from its standby position and places the cartridge 25A on the locating plate 47 at the front of the press 20 (see FIG. 2). After the cartridge stops on the plate, the transfer mechanism may continue to move downwardly a short distance as permitted by the notches 71 as long as the pins 70 remain in the vertical-sided lower portions of the notches. Accordingly, the notched hand 50A eliminates the need for stopping downward movement of the transfer mechanism precisely when the cartridge first stops against the plate. Thus, the hand allows wide latitude in programming the stopped position of the transfer mechanism and compensates for positioning inaccuracies which might accumulate throughout the system.

The hand 50A then is advanced from the position shown in FIG. 2 to the position shown in FIG. 3 to cause the spring fingers 27 to grip the tools 22 in the press 20. Thereafter, the hand is retracted to withdraw the tools from the press.

The transfer mechanism 35 then traverses horizontally toward the storage rack 30 to return the cartridge 25A toward the appropriate shelf 32. Thereafter, the transfer mechanism shifts downwardly to lower the cartridge from a position above the shelf to a position on the shelf. When downward movement of the cartridge is stopped by the shelf, the transfer mechanism 35 continues its downward movement to cause the notches 71 in the hooks to move downwardly to positions well clear of the pins. It will be apparent that the notched hooks 60 avoid the need for establishing a precise relationship between the elevation of the shelf 32 and the elevation at which downward movement of the hand is stopped. Indeed, a dimensional difference on the order of 5/16" between the two elevations can easily be accommodated. As a result, the rack 30 can be designed with loose tolerances and can be made with relatively simple and low cost fabricating techniques. The system does not require an expensive precision rack or a rack with precise locating surfaces.

Once the hand 50A has been lowered so that the notches 71 clear the pins 70, the cylinder 44A is actuated to retract the hand away from the cartridge 25A. As a result of the substantial lateral clearance between the hooks and the cartridge 25A, the hooks do not disturb the position of the cartridge on the shelf 32 when the hand is retracted away from the cartridge.

The transfer mechanism 35 is raised, lowered and/or turned to position the hand 50A in the vicinity of the next cartridge 25C to be picked up from the rack 30. Again, it is not necessary that the hand be located at a precise elevation to pick up the cartridge. Once the hand has been located at a general elevation, the cylinder 44A is actuated to extend the hand. As an incident thereto, the hooks pass freely alongside the cartridge and the notches 71 move to positions beneath the pins 70. Once the notches 71 have been positioned beneath the pins 70, the transfer mechanism 35 is raised to shift the hand 50A upwardly and to cause the pins to seat in the notches. Thereafter, the hooks 60 lift the cartridge from the shelf 32 preparatory to the transfer mechanism traversing back to the press 20.

In accordance with the present invention, the retainers or hooks 60 are equipped with unique cams 80 (FIGS. 9 and 11) which serve to center each cartridge 25 laterally between the hooks automatically when the cartridge is lifted by the hooks. In this way, if the cartridge is slightly out of centered alignment with the hooks when the hooks start to lift the cartridge from the tool shelf 32, the cams automatically center the cartridge laterally between the hooks so that the tools 22 will be in the proper lateral position for insertion into the tool holders 23.

More specifically, there is one cam 80 associated with each hook 60 and, in the present instance, the cams are in the form of plates which are secured rigidly to the laterally facing outboard sides of the hooks. Each cam plate 80 is located adjacent the lower notch 71 in the hook and partially overlaps the lower end portion of the notch.

Pursuant to the invention, each cam plate 80 is formed with a cam surface 81 (FIGS. 11 and 12) which coacts with the lower lifting pins 70 of the cartridge 25 to cause the cartridge to assume a laterally centered position between the hooks 60 when the cartridge is lifted. Herein, each cam surface 81 is defined by a beveled upper edge of the cam plate 80, such edge being inclined so that it slants laterally inwardly as it progresses downwardly. To coact with the cam surfaces and produce a good camming action, the free end portions of the lower lifting pins 70 of each cartridge are tapered as indicated at 83 (FIGS. 11 and 12) and define frustoconical surfaces.

Figure 11:
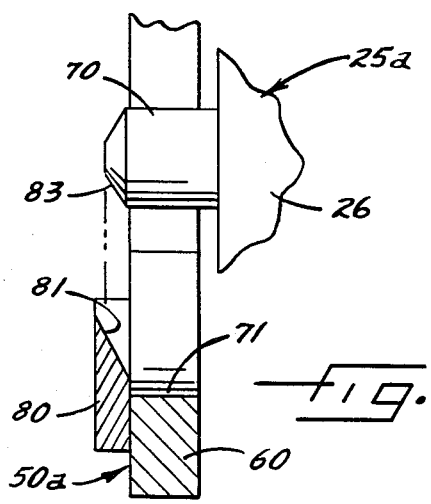
FIG. 11 is an enlarged fragmentary cross-section taken substantially along the line 11—11 of FIG. 9.

With the foregoing arrangement, the lower lifting pins 70 of a cartridge 25 resting on the tool shelf 32 are positioned well above the notches 71 and the cam plates 80 of the hooks 60 when the hand 50 moves horizontally toward the cartridge and into a position to lift the cartridge from the tool shelf (see FIG. 11). The horizontally opening slots 72 in the hooks 60 do, of course, permit the hand 50 to move horizontally to a position in which the lower lifting pins 7 are alined vertically with the upwardly opening notches 71.

Figure 12:
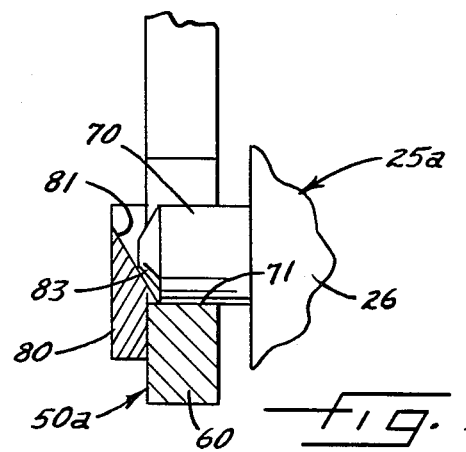
FIG. 12 is a view similar to FIG. 11 but shows certain parts in moved positions.

When the hand 50 is shifted vertically to lift the cartridge 25, one of the cam surfaces 81 will, if the cartridge is laterally offcenter relative to the hand, coact with the associated lower lifting pin 70 to automatically shift the cartridge to a laterally centered position in the hand. Assume, for example, that the cartridge 25 has inadvertently been shifted on the tool shelf 32 to a position slightly to the left of a perfectly centered position as exemplified by the cartridge shown in FIG. 11. When the hand 50 is lifted, the cam surface 81 of the cam plate 80 on the left hook 60 engages and cams against the tapered end portion 83 of the overlying lifting pin 70 of the cartridge. As a result of such engagement, the cartridge is cammed to the right and, by the time the pin 70 bottoms against the notch 71, the cartridge is brought to a precisely laterally centered position between the hooks 60 as shown in FIG. 12. The same camming action but in a reverse direction is produced by the cam plate 81 on the right hook 60 if the cartridge should happen to be offset to the right with respect to the center of the hand at the time the hand starts lifting the cartridge.

From the foregoing, it will be apparent that the present invention brings to the art a new and improved cartridge-lifting hand 50 in which the retainers or hooks 60 are laterally stationary while still being capable of maintaining the cartridge 25 in a laterally centered position in the hand. Because it is not necessary to shift the hooks laterally in order to center the cartridge, there is no need to support the hooks for lateral movement on the mounting bracket 52, there is no need for an actuator for shifting the hooks and there is no need of an actuator control system. Accordingly, the hand is of relatively simple and inexpensive construction.

We claim:

1. Apparatus for transferring a tool cartridge between a tool storage shelf and a machine tool, the tool cartridge having a pair of horizontally extending carrying elements projecting laterally from opposite sides of the cartridge, said apparatus comprising a lifting and carrying mechanism, means for moving said mechanism upwardly to lift the tool cartridge from the storage shelf and downwardly to place the cartridge on the shelf, means for moving said mechanism horizontally to transfer the cartridge between the storage shelf and the machine tool, said mechanism comprising a pair of laterally spaced retainers adapted to closely straddle the sides of the cartridge, upwardly opening notches formed in said retainers and sized to slidably receive said carrying elements so as to enable said retainers to lift and carry said cartridge while permitting said cartridge to float vertically relative to said retainers, said apparatus being characterized in that said retainers are fixed laterally relative to one another and are provided with cam means adjacent said notches, said cam means being engageable with said carrying elements to cam said cartridge to a laterally centered position between said retainers automatically as an incident to said retainers initially lifting said cartridge.

2. Apparatus as defined in claim 1 in which said cam means comprise cams located on the laterally outboard sides of said retainers and having cam surfaces which slant laterally inwardly upon progressing downwardly.

3. Apparatus as defined in claim 2 in which said cam surfaces are located closely adjacent the bottoms of said notches.

4. Apparatus as defined in claim 2 in which said carrying elements comprise horizontally extending and generally cylindrical pins sized for slidable reception in said notches, the end portions of said pins being tapered and being engageable with said cam surfaces to help cam said cartridge to a laterally centered position between said retainers during initial lifting of said cartridge by said retainers.

5. Apparatus as defined in claim 4 in which said pins are located adjacent the lower end of said cartridge, said notches opening upwardly out of the lower end portion of said retainers, said apparatus further comprising a second pair of horizontally extending and generally cylindrical pins projecting laterally from opposite sides of said cartridge above said first pins, and second upwardly opening notches formed in said retainers above said first notches and slidably receiving said second pins.

6. Apparatus as defined in claim 5 further including generally horizontal slots opening out of the forward ends of said retainers and leading into said first notches.

* * * * *